United States Patent
Motazedi et al.

(10) Patent No.: US 11,693,926 B2
(45) Date of Patent: Jul. 4, 2023

(54) NEUROMORPHIC EXPERIENTIAL SYSTEM

(71) Applicant: Accenture Global Solutions Limited, Dublin (IE)

(72) Inventors: Eric Motazedi, Centennial, CO (US); Alejandro Leon Escalera, Puebla (MX); Zuzana Harcarikova, Bratislava (SK)

(73) Assignee: Accenture Global Solutions Limited, Dublin (IE)

( * ) Notice: Subject to any disclaimer, the term of this patent is extended or adjusted under 35 U.S.C. 154(b) by 46 days.

(21) Appl. No.: 17/320,501

(22) Filed: May 14, 2021

(65) Prior Publication Data
US 2021/0365463 A1 Nov. 25, 2021

Related U.S. Application Data

(60) Provisional application No. 63/029,158, filed on May 22, 2020.

(51) Int. Cl.
| | | |
|---|---|---|
| *G06F 18/25* | (2023.01) | |
| *G06F 16/2455* | (2019.01) | |
| *G06F 16/2458* | (2019.01) | |

(52) U.S. Cl.
CPC ........ *G06F 18/251* (2023.01); *G06F 16/2471* (2019.01); *G06F 16/24568* (2019.01)

(58) Field of Classification Search
CPC ........... G06F 16/24568; G06F 16/2471; G06F 18/251; G06K 9/6289
See application file for complete search history.

(56) References Cited

U.S. PATENT DOCUMENTS

| | | | |
|---|---|---|---|
| 9,568,943 B1* | 2/2017 | Carman | G06F 1/14 |
| 2013/0330055 A1* | 12/2013 | Zimmermann | H04N 21/4828 |
| | | | 386/240 |
| 2016/0006779 A1* | 1/2016 | Zhou | G06F 16/24542 |
| | | | 709/231 |
| 2017/0363423 A1* | 12/2017 | Dormody | G01L 27/002 |
| 2019/0050451 A1* | 2/2019 | Davidoff | G06F 16/2425 |
| 2019/0138927 A1* | 5/2019 | Jeffries | H03M 7/3068 |
| 2021/0271902 A1* | 9/2021 | Aoki | B60W 40/04 |
| 2021/0285777 A1* | 9/2021 | Ostadzadeh | G01C 21/3617 |

\* cited by examiner

*Primary Examiner* — Dangelino N Gortayo
(74) *Attorney, Agent, or Firm* — Fish & Richardson P.C.

(57) ABSTRACT

Methods, systems, and apparatus, including computer programs encoded on a computer storage medium, for neuromorphic experiential analysis of sensor data. The methods, systems, and apparatus include actions of obtaining sensor emissions from multiple sensors, generating monotonic data that indicates an orientation of the sensor emissions in respect to time, determining that the monotonic data matches a registered query, and in response to determining that the monotonic data matches a registered query, invoking an executor.

20 Claims, 5 Drawing Sheets

NEUROMORPHIC EXPERIENTIAL SYSTEM

CROSS-REFERENCE TO RELATED APPLICATION

This application claims the benefit of U.S. Provisional Application No. 63/029,158, filed May 22, 2020, which is incorporated by reference in its entirety.

TECHNICAL FIELD

This disclosure generally relates to sensors.

BACKGROUND

Various systems may use sensor to collect data. For example, a system may collect data that indicates temperatures detected throughout a day at various geographic locations in which temperature sensors are located.

SUMMARY

In general, an aspect of the subject matter described in this specification may involve a process for neuromorphic experiential analysis of sensor data. Data collection across distributed sensor systems may be a very complex endeavor. Multiple factors may inhibit the collection of data across sensor networks, including divergent sensor behaviors and/or output rates, network latency and intermittent network availability.

Sensor data may be analyzed using a system designed for physical environments to facilitate human and machine interactions. The system may combine the latest thinking around multisensory integration, distributed communication, and neural network processing of sensor emissions in large dynamic environments. The system may be based on identifying key areas where immediate value can be created, followed by event storming sessions to define each bounded context within the domain, including requirements that are in and out of scope for the specified domain.

In some aspects, the subject matter described in this specification may be embodied in methods that may include the actions of obtaining sensor emissions from multiple sensors, generating monotonic data that indicates an orientation of the sensor emissions in respect to time, determining that the monotonic data matches a registered query, and in response to determining that the monotonic data matches a registered query, invoking an executor.

Other implementations of this and other aspects include corresponding systems, apparatus, and computer programs, may be configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects determining that the monotonic data matches a registered query includes identifying a portion of the monotonic data that was generated during a particular contiguous time period and determining whether the portion of the monotonic data matches the registered query.

In certain aspects, determining that the monotonic data matches a registered query includes determining that a first domain action pair specified by the registered query matches a second domain action pair specified by the monotonic data. In some implementations, determining that the monotonic data matches a registered query includes determining that a first origin specified by the registered query matches a second origin specified by the monotonic data. In some aspects, generating monotonic data that indicates an orientation of the sensor emissions in respect to time includes generating a first portion of the monotonic data from the sensor emissions that were obtained during a first time period and generating a second portion of the monotonic data from the sensor emissions that were obtained during a second time period, wherein the second time period partially overlaps the first time period.

In certain aspects, invoking an executor includes providing the monotonic data to the executor. In some implementations, actions include determining that a specified time period has lapsed and based on determining that the specified time period has lapsed, invoking a second executor.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

Figure 1:
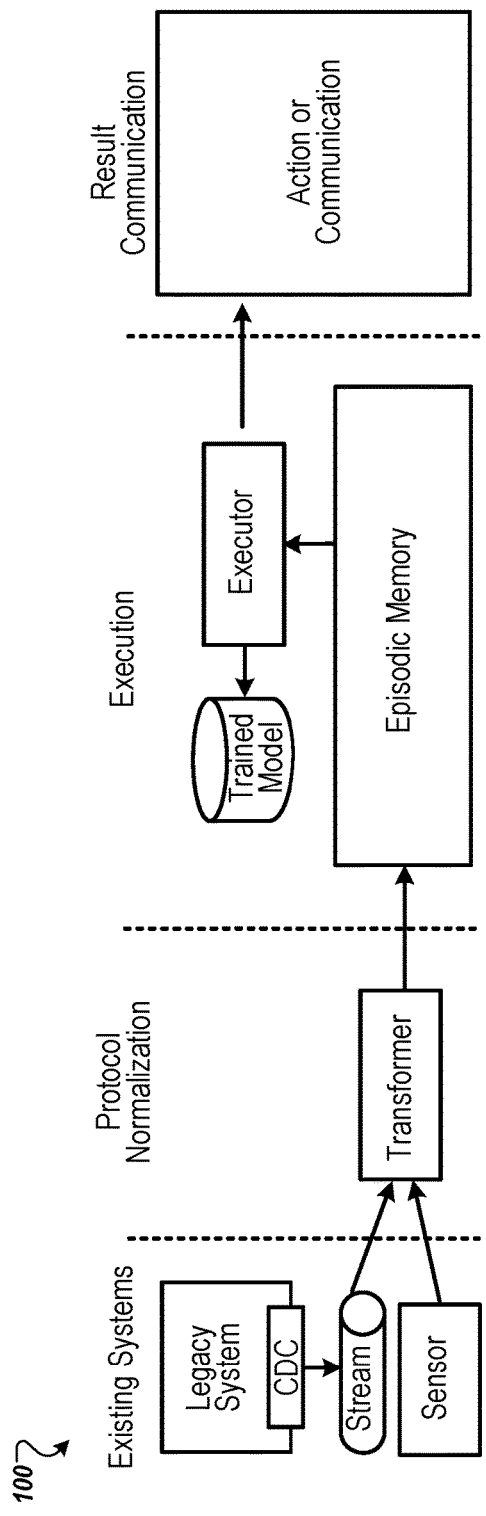
FIG. 1 illustrates a block diagram of an example system for neuromorphic experiential analysis of sensor data.

FIG. 1 illustrates a block diagram of an example system 100 for neuromorphic experiential analysis of sensor data. The system 100 includes a legacy system, a sensor, a transformer, an episodic memory, an executor, a trained model, and action or communication.

There may be many difficult problems associated with any distributed systems, and especially systems that involve vehicles with intermittent and latent communication. A platform may utilize a custom Communitive Replicated Data Type (CRDT) protocol for all sensor and data communication to reduce system entropy for eventual convergence. For example, the CRDT protocol may be the temporal disentanglement protocol for event ordering that is described in U.S. Pat. App. No. 63/175,176, filed on Apr. 15, 2021, which is incorporated by reference in its entirety.

Utilizing a common CRDT based protocol may greatly reduce common problems like clock skew, eventual state synchronization, and high frequency sensor emission monotonicity.

Creating actionable context may require a complex combination of sensor and data emissions from many different sources. Individual emission sources may have unique formats and emission frequencies. Further compounding complexity, actionable data sources may be stored in legacy systems that may not support modern modes of communication. Unlocking this data may require major modifications that are costly and time-consuming, while replacing entire sensor and data systems may be cost prohibitive.

In order to connect to existing data and sensor emission systems without requiring costly or impractical modifications, utilizing software transformers for Change Data Capture (CDC) software in existing data systems, and implementation of hardware transformer shunts to physical sensor systems, may make data and sensor emissions rapidly available for ubiquitous consumption. Transforming mission critical sensor and data emissions may ensure individual systems can remain in place, while providing an accessible pathway to enhanced features and functionality.

Transformers may take individual emissions and convert them into the CRDT format. Transformed sensor emissions may then be forwarded for collection, distribution and processing to the episodic memory. The system 100 may merge incoming CRDT payloads into a temporally oriented memory, whose architecture is inspired by the human episodic memory. The human episodic memory may be responsible for taking all different senses, thoughts and human experiences; merging them together to form a coherent view of the world.

The system's episodic memory may be designed to be extremely lightweight, mimic the human episodic memory and run on a wide variety of platforms from high performance server environments down to low power Advanced RISC Machines (ARM) based processors. By enabling a wide variety of host machines and architectures, episodic memory may be able to perform edge storage and processing, while simultaneously acting as a large-scale cloud based or on-premise storage and execution system.

Episodic memory may utilize upward propagation of all processed data and sensor emissions to higher level episodic memory instances, enabling upstream systems to communicate with further upstream systems. Upward propagation may allow small sensor clusters on individual machines to run workloads, process and store information at a micro level, while propagating information to higher level systems; creating a more ubiquitous sensory environment across different systems at multiple levels. There may be many benefits to utilizing the same system at multiple levels including decreasing total aggregate architectural complexity and simplified sensor processing deployments at scale.

The episodic memory may perform three main functions, high speed temporally oriented storage, queryable execution pipeline, and cold storage of past events for future replay. The episodic memory may orient incoming data temporally from CRDTs by domain, event and origin. The episodic memory's temporal storage may not implement a custom storage engine, but instead functions as a logic and orchestration layer over existing in-memory storage systems. The episodic memory may utilize Redis as it's in memory storage system, and other types of high performance in-memory database can be used.

Accessing sensor emissions may be done through the registration of queries by domain, event name and origin. The episodic memory may monitor incoming CRDT payloads and any items that match registered query criteria may automatically spawn the matching registered executor, injecting all matching registered payloads to the executor within the timeframe specified in the execution query.

The executers may be invoked based on multiple criteria types from incoming sensor emissions. The episodic memory may invoke Kubernetes containers to handle the execution workloads dynamically within the desired time frame, injecting all matching sensor payloads. The episodic memory may expose two types of execution pipelines: event driven executors and subscription-based executors.

Event driven executors may look for any matching domain and event pair (also referred to as domain action pair) and/or emission origin to create a dynamic sliding window of matching emission data within a specified time window. The episodic memory may scan all incoming event emissions and matches them with registered queries, automatically invoking all registered executors within each registered executor individually specified time window. Event driven executors may enable a wide variety of use cases, including neural network and analytics processing of incoming sensor data, edge processing of local sensor payloads, real-time sensor fusion workloads by interpreting different sensor emission types and frequencies within a defined time window, and geospatial workloads to examining sensor emissions within a specific geofence.

Figure 2:
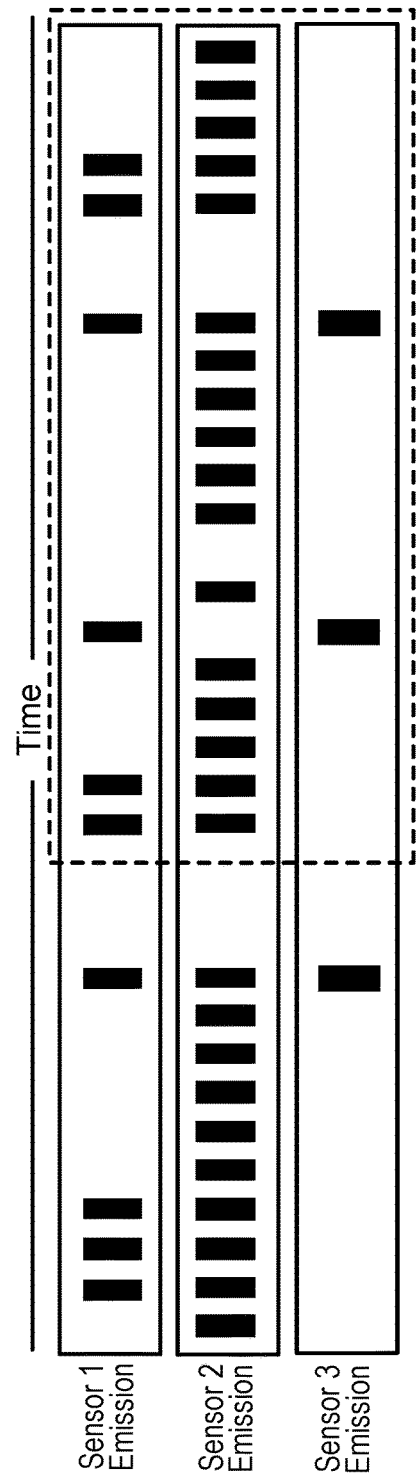
FIG. 2 illustrates a diagram of example timing of sensor emissions.

Subscription based executers may differ from event driven executers in that subscription based executers may only execute once in a specified time period and provide the ability to update the subscription queries on the fly. Common uses of subscription-based executers may be user interface (UI) view operations that are based on the geofence shown on an area on screen, with the time period specified to match the desired UI refresh rate, and sensor fusion workloads based on a desired accumulation time frame, e.g. interpreting multiple vehicle sensors, including radar, FLIR (Forward-Looking Infrared) and camera systems to determine target type and location across a variety of different sensors FIG. 2 illustrates a diagram of example timing 200 of sensor emissions. An event driven executor may detect that the sensor emissions from Sensors 1, 2, and 3 shown in the dotted box match a particular event and, in response, invoke an executor registered to the particular event.

Figure 3:
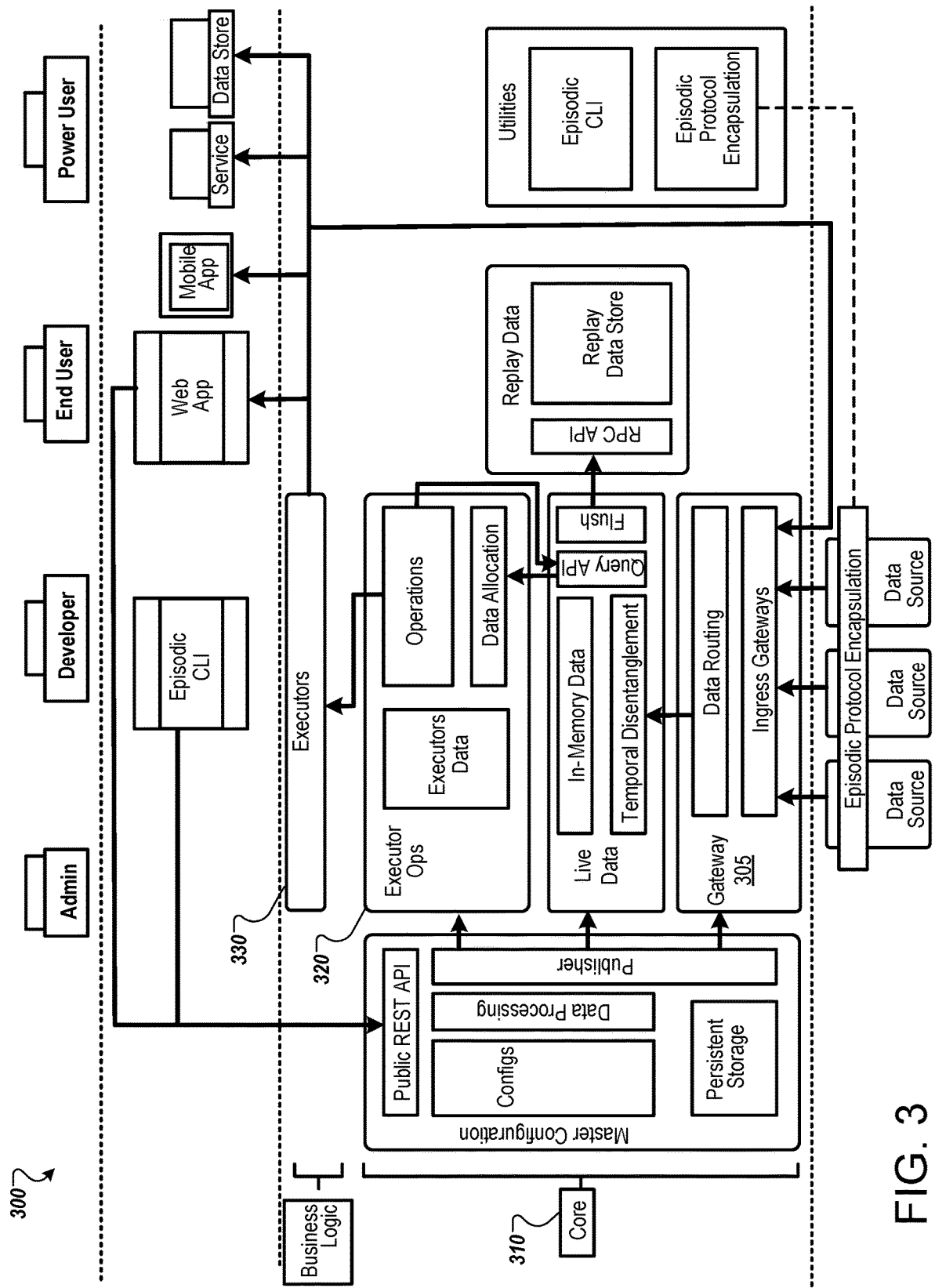
FIG. 3 illustrates a block diagram of an example platform that performs neuromorphic experiential analysis of sensor data.

FIG. 3 illustrates a block diagram of an example platform 300 that performs neuromorphic experiential analysis of sensor data. The platform 300 includes a gateway 305 that generates monotonic data that indicates an orientation of sensor emissions in respect to time, and a core 310 that includes an executor operations component 320 that receives registrations of executors 330 that are associated with various queries. The executor operations component 320 then obtains episodic memories, analyzes the episodic memories in view of the registered executors 330, and provides the executors 330 the episodic memories when associated conditions for invoking the executors 330 are satisfied, as described above in FIG. 1.

Figure 4:
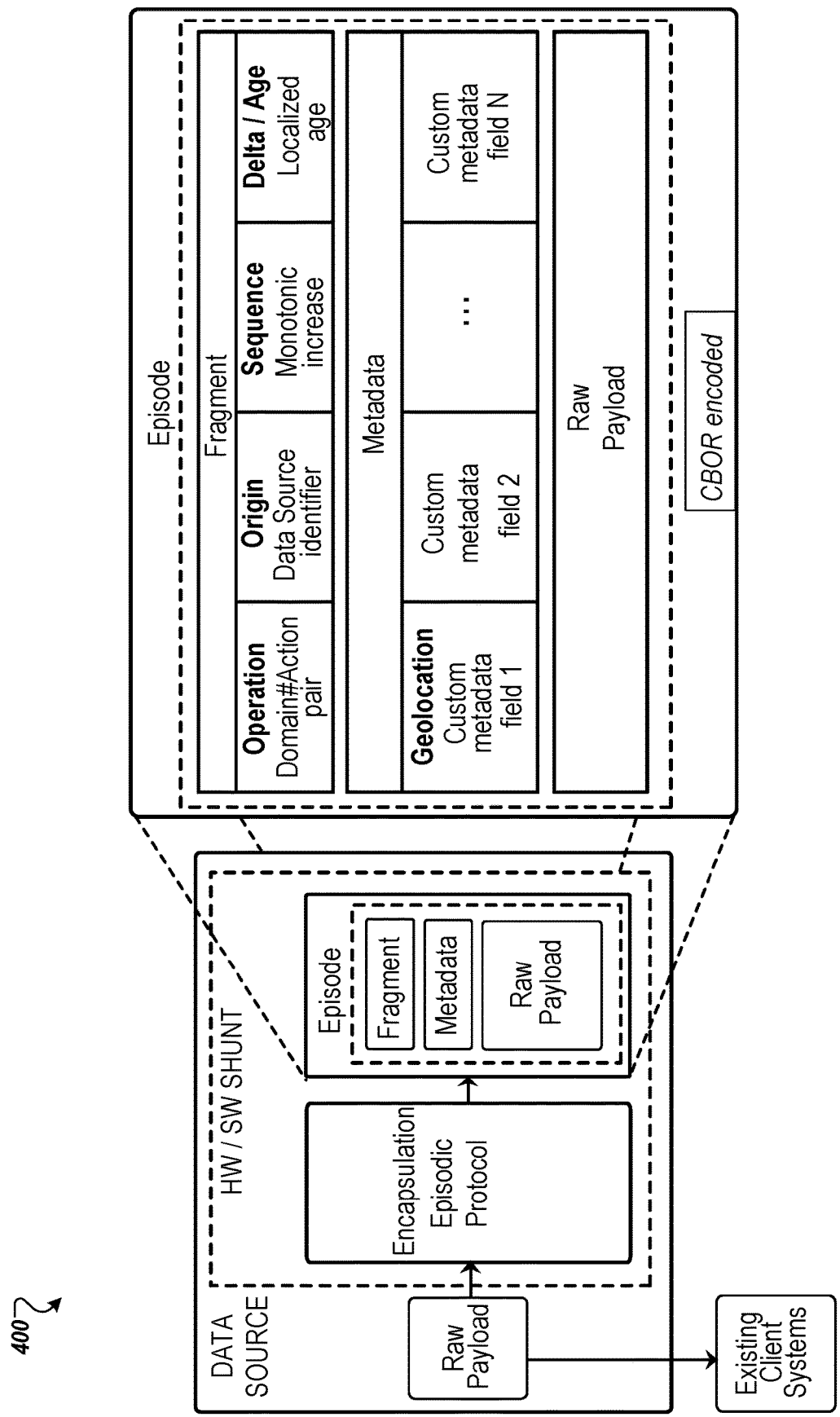
FIG. 4 illustrates a block diagram of an example generation of an episodic memory.

FIG. 4 illustrates a block diagram 400 of an example generation of an episodic memory. Raw payload is ingested by an encapsulation episodic protocol, which then generates an episodic memory (also referred to as an episode). The episode includes a fragment portion, that includes a first portion that specifies an operation, e.g., domain action pair, a second portion that specifies an origin, e.g., a data source identifier, a third portion that specifies a sequence, e.g., monotonic increase, and a fourth portion that specifies a delta, e.g., localized age. The episode may include metadata, e.g., geolocation data, and a raw payload.

Figure 5:
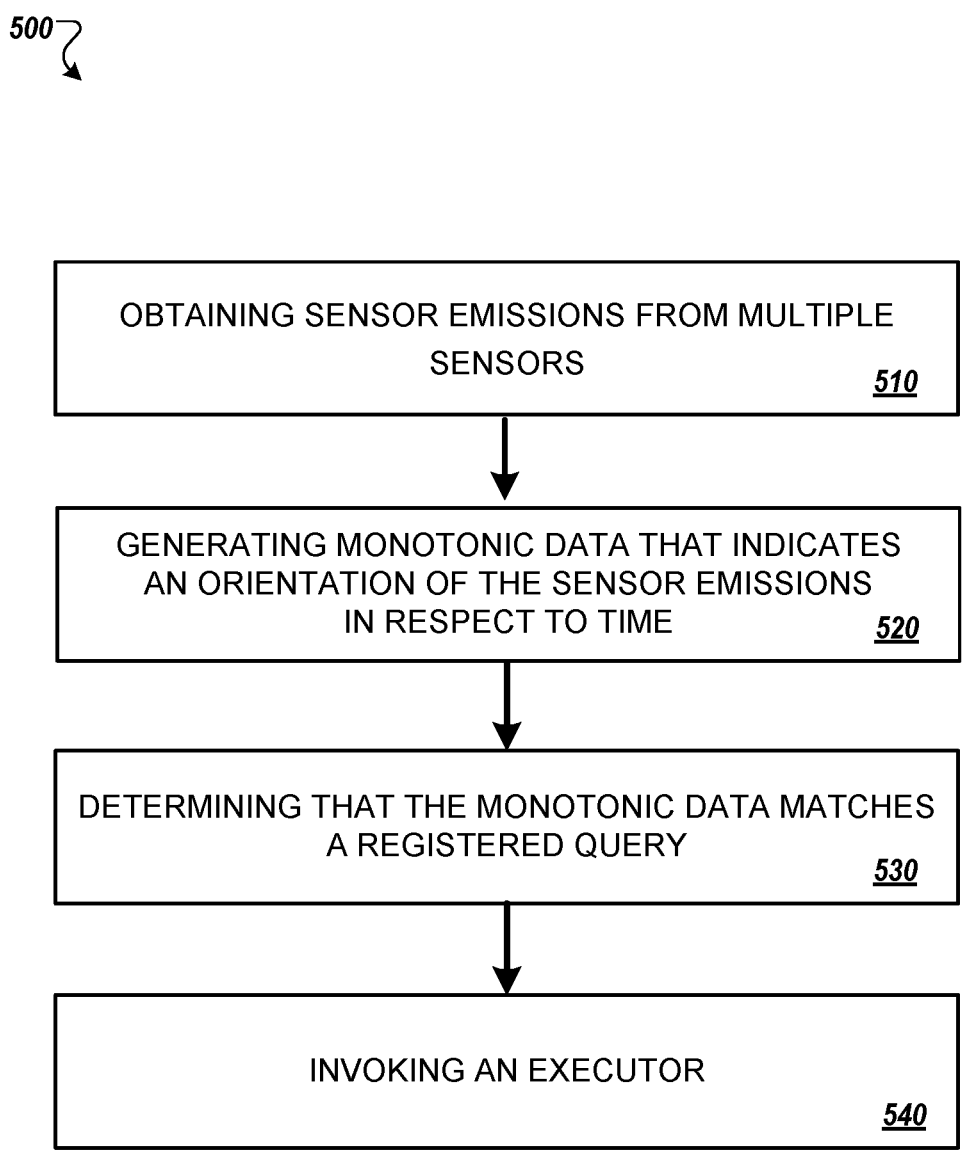
FIG. 5 illustrates a flowchart of an example process for neuromorphic experiential analysis of sensor data.

FIG. 5 illustrates a flowchart of an example process 500 for neuromorphic experiential analysis of sensor data.

Briefly, and described in more detail below, the process 500 includes obtaining sensor emissions from multiple sensors (510), generating monotonic data that indicates an orientation of the sensor emissions in respect to time (520), determining that the monotonic data matches a registered query (530), and in response to determining that the monotonic data matches a registered query, invoking an executor (540). The process 500 may be performed by one or more of the system 100 in FIG. 1 or the executor operations component 320 in FIG. 3.

The process 500 includes obtaining sensor emissions from multiple sensors (510). For example, the core 310 may obtain sensor emissions from two, three, five, or some other number of data sources.

The process 500 includes generating monotonic data that indicates an orientation of the sensor emissions in respect to time (520). For example, the gateway 305 may receive sensor emissions from three data sources, and label each of the sensor emissions with an identifier that indicates where in a sequence that the sensor emission was obtained, where the sequence includes all the received sensor emissions.

In some implementations, generating monotonic data that indicates an orientation of the sensor emissions in respect to time includes, generating a first portion of the monotonic data from the sensor emissions that were obtained during a first time period and generating a second portion of the monotonic data from the sensor emissions that were obtained during a second time period, where the second time period partially overlaps the first time period. For example, the executor operations 320 may generate multiple memories from the sensor emissions from the three data sources, where a memory is generated every two hundred milliseconds and includes sensor emissions during the prior two seconds.

The process 500 includes determining that the monotonic data matches a registered query (530). For example, the executor operations 320 may determine that a particular episode matches conditions specified by a registered query.

In some implementations, determining that the monotonic data matches a registered query includes identifying a portion of the monotonic data that was generated during a particular contiguous time period and determining whether the portion of the monotonic data matches the registered query. For example, the executor operations 320 may identify a first episode that represents a particular two second period, and determine that the first episode matches a registered query. In another example, the executor operations 320 may identify a second episode that represents another two second period, and determine that the second episode does not match the registered query.

In some implementations determining that the monotonic data matches a registered query includes determining that a first domain action pair specified by the registered query matches a second domain action pair specified by the monotonic data. For example, the executor operations 320 may determine that a domain action pair specified for a particular episode is identical to a domain action pair specified by an executor.

The process 500 includes in response to determining that the monotonic data matches a registered query, invoking an executor (540). For example, the executor operations component 320 may invoke a particular executor that was registered to be invoked when an episode with a specific domain action pair is obtained.

In some implementations, invoking an executor includes providing the monotonic data to the executor. For example, the executor may be already executing and the executor operations component 320 may invoke the executor may transmitting the episode to the executor.

In some implementations, the process 500 includes determining that a specified time period has lapsed and based on determining that the specified time period has lapsed, invoking a second executor. For example, the executor operations component 320 may determine that three seconds have lapsed since a second executor was last invoked and, in response, invoke the second executor.

In some implementations, wherein the specified time period is a next earliest time period in a periodic time interval. For example, a second executor may register that it should be invoked every three seconds, and the executor operations component 320 may provide a most recent episode obtained to the executor every three seconds.

Figure 6:
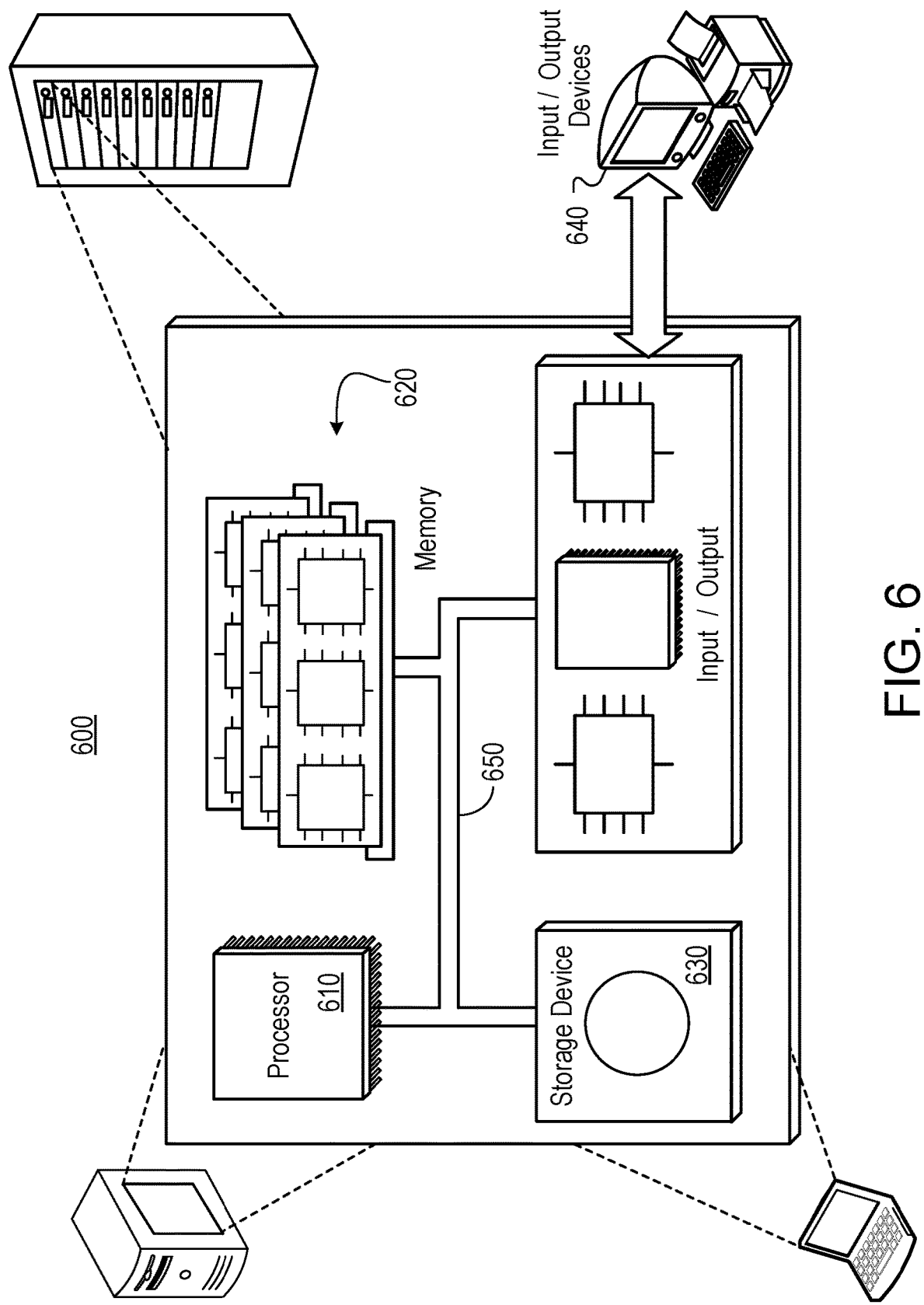
FIG. 6 illustrates a schematic diagram of an exemplary generic computer system.

FIG. 6 illustrates a schematic diagram of an exemplary generic computer system. The system 600 may be included in the system 100, and implement the episodic memory and/or the executor.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, a solid state drive, an optical disk device, a tape device, universal serial bus stick, or some other storage device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a rail trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

What is claimed is:

1. A computer-implemented method comprising:
obtaining sensor emissions from multiple sensors;
generating monotonic data that indicates timing of the sensor emissions;
accessing, from a memory, stored data representing a set of events;
determining that a portion of the monotonic data matches a particular event of the set of events; and
in response to determining that the portion of the monotonic data matches the particular event, invoking an executor that is registered to the particular event.

2. The method of claim 1, wherein the portion of the monotonic data represents sensor emissions that were obtained during a particular contiguous time period.

3. The method of claim 1, wherein determining that the portion of the monotonic data matches a particular event of the set of events comprises:
determining that a first domain action pair specified by the particular event matches a second domain action pair specified by the portion of the monotonic data.

4. The method of claim 1, wherein determining that the portion of the monotonic data matches a particular event of the set of events comprises:
determining that a first source of sensor emissions specified by the particular event matches a second source of sensor emissions specified by the portion of the monotonic data.

5. The method of claim 1, wherein:
generating monotonic data that indicates timing of the sensor emissions comprises:
generating a first portion of the monotonic data from sensor emissions that were obtained during a first time period; and
generating a second portion of the monotonic data from sensor emissions that were obtained during a second time period, wherein the second time period partially overlaps the first time period, and
the portion of the monotonic data that matches the particular event comprises the first portion of the monotonic data or the second portion of the monotonic data.

6. The method of claim 1, wherein invoking an executor comprises:
providing the portion of the monotonic data to the executor.

7. The method of claim 1, comprising:
after invoking the executor that is registered to the particular event, determining that a specified time period has lapsed; and
based on determining that the specified time period has lapsed, invoking a second executor that is registered to a second event that matches a second portion of the monotonic data.

8. The method of claim 7, wherein the specified time period is a next earliest time period in a periodic time interval.

9. The method of claim 1, wherein generating monotonic data that indicates timing of the sensor emissions comprises labeling each sensor emission with an identifier that indicates a position of the sensor emission in a sequence of sensor emissions.

10. The method of claim 1, wherein generating monotonic data that indicates timing of the sensor emissions comprises converting the sensor emissions from the multiple sensors to a common data format.

11. A system comprising:
one or more computers and one or more storage devices storing instructions that are operable, when executed by the one or more computers, to cause the one or more computers to perform operations comprising:
obtaining sensor emissions from multiple sensors;
generating monotonic data that indicates timing of the sensor emissions;
accessing, from a memory, stored data representing a set of events;
determining that a portion of the monotonic data matches a particular event of the set of events; and in response to determining that the portion of the monotonic data matches the particular event, invoking an executor that is registered to the particular event.

12. The system of claim 11, wherein the portion of the monotonic data represents sensor emissions that were obtained during a particular contiguous time period.

13. The system of claim 11, wherein determining that the portion of the monotonic data matches a particular event of the set of events comprises:
   determining that a first domain action pair specified by the particular event matches a second domain action pair specified by the portion of the monotonic data.

14. The system of claim 11, wherein determining that the portion of the monotonic data matches a particular event of the set of events query comprises:
   determining that a first source of sensor emissions specified by the particular event matches a second source of sensor emissions specified by the portion of the monotonic data.

15. The system of claim 11, wherein generating monotonic data that indicates timing of the sensor emissions comprises:
   generating a first portion of the monotonic data from the sensor emissions that were obtained during a first time period; and
   generating a second portion of the monotonic data from the sensor emissions that were obtained during a second time period, wherein the second time period partially overlaps the first time period.

16. The system of claim 11, wherein invoking an executor comprises:
   providing the portion of the monotonic data to the executor.

17. The system of claim 11, the operations comprising:
   after invoking the executor that is registered to the particular event, determining that a specified time period has lapsed; and
   based on determining that the specified time period has lapsed, invoking a second executor that is registered to a second event that matches a second portion of the monotonic data.

18. The system of claim 17, wherein the specified time period is a next earliest time period in a periodic time interval.

19. A non-transitory computer-readable medium storing software comprising instructions executable by one or more computers which, upon such execution, cause the one or more computers to perform operations comprising:
   obtaining sensor emissions from multiple sensors;
   generating monotonic data that indicates timing of the sensor emissions;
   accessing, from a memory, stored data representing a set of events;
   determining that a portion of the monotonic data matches a particular event of the set of events; and
   in response to determining that the portion of the monotonic data matches the particular event, invoking an executor that is registered to the particular event.

20. The medium of claim 19, wherein determining that the portion of the monotonic data matches a particular event of the set of events comprises:
   determining that a first source of sensor emissions specified by the particular event matches a second source of sensor emissions specified by the portion of the monotonic data.

* * * * *